United States Patent [19]

Daublebsky et al.

[11] 3,779,134

[45] Dec. 18, 1973

[54] NUCLEAR REACTOR CONTROL ROD DRIVES

[75] Inventors: Peter Daublebsky; Gunter Zeitzschel, both of Frankfurt, Germany

[73] Assignee: Licentia, Patent-Verwaltungs-G.m.b.H., Frankfurt am Main, Germany

[22] Filed: June 7, 1971

[21] Appl. No.: 150,360

[30] Foreign Application Priority Data
June 6, 1970 Germany............... P 20 27 988.3

[52] U.S. Cl............................. 91/44, 92/22, 176/36, 91/45
[51] Int. Cl............................................. F15b 15/26
[58] Field of Search........................... 91/41, 49, 45; 92/19, 22, 23, 24, 30; 176/36

[56] References Cited
UNITED STATES PATENTS

| | | | |
|---|---|---|---|
| 3,398,492 | 8/1968 | Nansel | 92/23 |
| 3,020,887 | 2/1962 | Hobson et al | 91/45 |
| 3,020,888 | 2/1962 | Braun | 91/45 |
| 3,527,670 | 9/1970 | Winders | 91/44 |
| 3,619,675 | 11/1971 | Baker | 176/36 |

Primary Examiner—Martin P. Schwadron
Assistant Examiner—A. M. Zupcic
Attorney—Spencer & Kaye

[57] ABSTRACT

A control rod drive for nuclear reactors in which the drive is actuated through a pressure medium that acts against a control piston associated with the rod and having a locking device which includes relatively movable latches that can be selectively engaged in detents in a guide tube for the piston. A second control piston is carried in axially spaced relationship to the control piston within the guide tube and has the same type of locking device. Means are provided within the guide tube to operatively interconnect the locking devices of the two control pistons in a sequential manner and to ensure that, during a movement of the drive in a direction to withdraw the control rod from the reactor, the latches of one locking device are engaged in an associated detent during a movement of the control piston crrrying the other locking device and this locking device is not disengaged until the latches of the other locking device are engaged in another detent.

10 Claims, 4 Drawing Figures

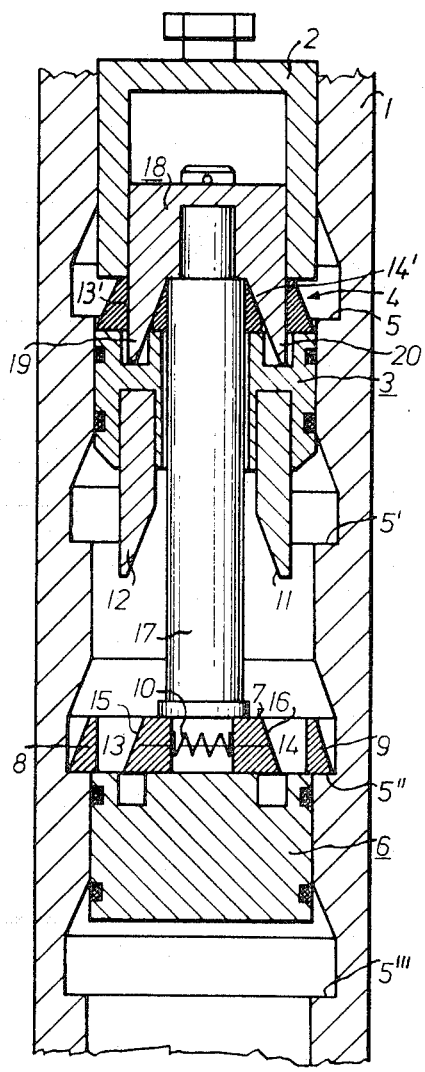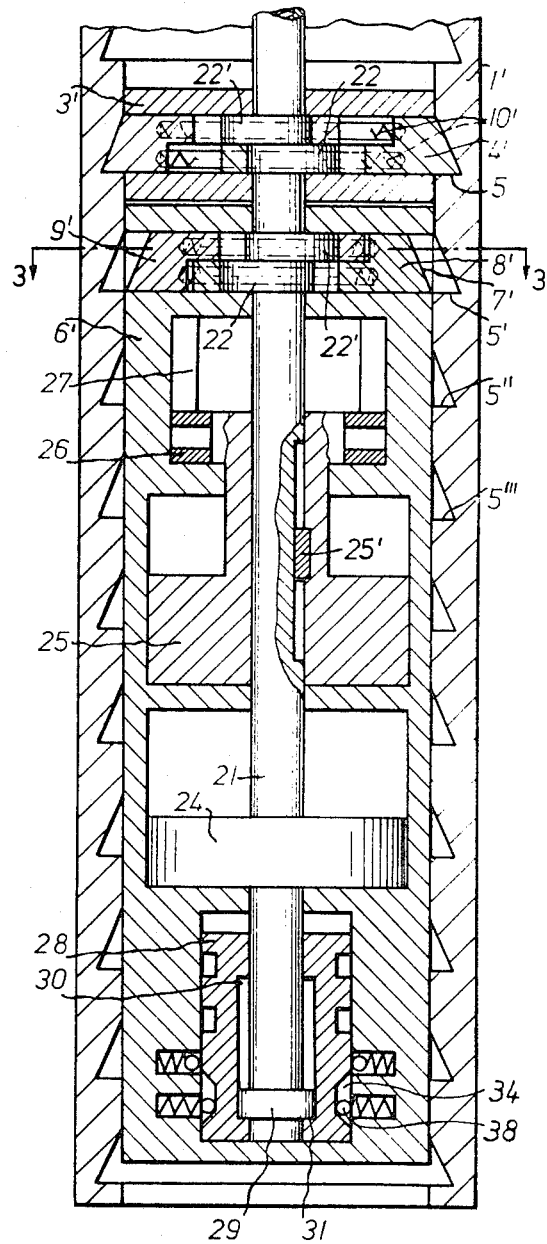

Inventors.
Peter Daublebsky
Günter Zeitzschel

BY Spencer & Kaye
ATTORNEYS.

NUCLEAR REACTOR CONTROL ROD DRIVES

BACKGROUND OF THE INVENTION

The present invention relates to nuclear reactors, and particularly to drive systems for the control rods thereof.

The reactivity, and thus the thermal output, of nuclear reactors is adjusted in many types of reactors by control rods which are provided with neutron absorbing material and which may be driven to a greater or lesser extent into the reactor core by a counter pressure acting on associated lifting pistons.

When the control rods are hydraulically driven by means of lifting cylinders, mechanical locks are generally provided and arranged so that during normal reactor operation, they will act to prevent the control rods from being pushed out of the reactor core in the event that the counter pressure acting on the lifting piston of the control rod fails or is effectively reduced because of pressure within the reactor core. Since very rapid insertion of the control rod into the reactor core must be possible, however, in the case of impending danger, the locks are so designed that an increase in the counter pressure at the lifting piston makes it possible to automatically insert the control rods into the reactor core. Locking devices of this type are described, for example, in an article entitled "Antrieb fur Reaktorregestabe" (Translation: Drive Means for Reactor Control Rods) by B. Schallopp in the magazine Nukleonik, Volumn 5, 1963, pages 124–133, particularly page 125, paragraphs 5a and 5b.

In order to bring the control rods out of the core by a given amount, the locking devices must first be moved out of the way. If, at this time, there should be a fault in the hydraulic system that would, for example, cause the operating pressure to collapse, the control rods would be thrust out of the reactor core with a strong force. This could initiate an uncontrolled chain reaction which could lead to a major reactor accident.

Even if the drive for the control rods of nuclear reactors were so designed that the control rod would be actuated by a control piston provided with locking devices, which piston moves in a guide tube provided with detent means so that the latches would immediately engage again when the operating pressure is missing, this does not provide a complete solution to the problem. With this type of latching system there still exists the danger that, because of the high acceleration of the control rods, they would have such a force by the time they are latched that the locking devices would be damaged or destroyed and the control rod could not hold.

German Published Pat. application No. 1,281,596 therefore proposes fixing the control rod positions, when the drive housing is broken or when the control rod is fastened to the pressure jacket by disposing the blocking latch within the pressure jacket in the immediate vicinity of the core zone and mounting the release device at the drive housing in such a manner that during normal operation of the reactor the latches are in an open position. However, this arrangement has the drawback that an additional locking device must be provided in the reactor pressure vessel for each control rod and this makes the entire installation more complicated and expensive. Moreover, the control of a locking device which is disposed inside the reactor pressure vessel is very difficult.

SUMMARY OF THE INVENTION

Therefore it is an object of the invention to provide a simple control rod drive for nuclear reactors in which the locking devices will hold the control rods safely in their approximate respective positions during normal reactor operation as well as when failures occur in the hydraulic or pneumatic systems.

This and other objects according to the present invention are achieved by the provision of a control rod drive for nuclear reactors in which the control rod is actuated by a control piston provided with locking devices and moves in a guide tube provided with detent means. With such an arrangement a second control piston, with locking means, is associated with the first control piston, and there are provided devices for the alternate release of the locking devices on both pistons. This permits alternate movement of the two pistons by one detent each in the same axial direction and the piston at rest is locked in the detent means. The alternating locking and unlocking of the two pistons may be accomplished in different ways, two of which will be described below.

BRIEF DESCRIPTION OF THE DRAWINGS

FIG. 1 is an elevational cross-sectional view of a control rod drive according to the present invention.

FIG. 2 is a view similar to that of FIG. 1 of a second embodiment of a control rod drive according to the present invention.

DESCRIPTION OF THE PREFERRED EMBODIMENTS

Figure 3:
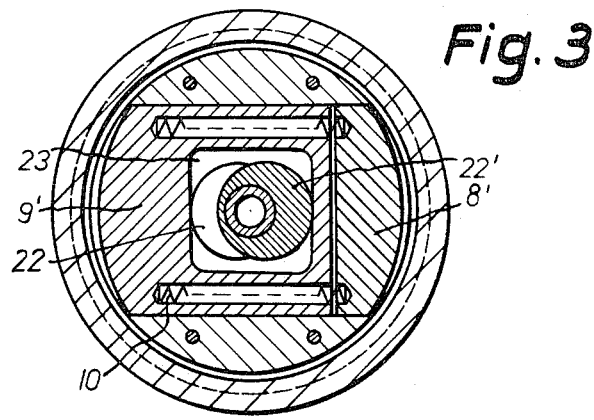
FIG. 3 is an axial cross-sectional view taken along the line 3—3 of FIG. 2.

In the embodiment shown in FIG. 1 the illustrated hydraulic control rod drive may be disposed in a nuclear reactor in the pressure vessel below the core lattice, or matrix, plate (not shown). A guide tube 1 is provided in which a lifting piston 2 can slide together with its control rod absorber portion (not shown). The manner in which a control rod, provided with neutron absorbing material, or its absorber part, is connected to lifting piston 2 is not important as far as the present invention is concerned. Such a connection is illustrated on page 111 (FIG. 5–12) and generally described on page 112, of a book by M. A. Schultz, CONTROL OF NUCLEAR REACTORS AND POWER PLANTS, McGraw-Hill Book Company, Inc., New York (1955). The lifting piston 2 rests on an upper control piston 3 which is provided with a locking device, generally indicated at 4. The locking device 4 may engage in detents 5, 5', 5'', etc. in tube 1 and thus prevent a downward movement of the upper control piston 3.

Below the control piston 3 a second control piston 6 is disposed in guide tube 1 and has a locking device, generally indicated at 7. This locking device 7 is constructed in the same manner as locking device 4 and consists of two latches 8 and 9 which are pressed apart, for example by means of springs 10. Latches 8 and 9 are here so shaped that they slide out of the detents in which they are engaged when the lower control piston 6 moves upward, but engage the detent during a downward movement. The two latches may be offset axially from one another at the center of the tube so that they come to rest on top of one another and guide each other. Such a design for the latches is shown in FIG. 2 and they will be described below.

The upper control piston 3 has two axially dependent fingers 11 and 12 which are designed to fit into slits 13 and 14 of latches 8 and 9. The slits 13 and 14 have oblique portions 15 and 16 so that latches 8 and 9 are moved radially inwardly out of their associated detent 5, 5', or 5'' when fingers 11 and 12 move into slits 13 and 14.

The lower control piston 6 has a coaxial extension 17 which passes through the upper control piston 3 and which has an attachment 18 at its upper end with axially dependent fingers 19 and 20 which correspond to fingers 11 and 12 and can engage in the same manner into slits 13' and 14' in the latches of the upper locking device 4. As seen in FIG. 1 the fingers 19 and 20 are engaged in the locking device 4 to retract the device from detent 5. Extention 17 has a radial opening at its lower end for passage of latches 8 and 9.

The necessary connecting line for the pressure medium to operate the control rod drive is not shown, nor are the connections in the control rod drive which assure that the full reactor pressure is effective on the upper surface of the upper control piston 3 while a somewhat lesser pressure is present on the upper surface of the lower control piston 6. However, this mode of operation is known in the art and a hydraulic drive system is shown for example in FIG. 5-12 of the book by Schultz previously cited. While, as shown there, the control rod engages in the reactor core from the top, it is also possible to introduce the rod from the bottom as it is described in conjunction with this invention.

The device shown in FIG. 1 operates as follows. The pressure in the reactor vessel first moves the unlocked upper control piston 3 together with its locking device 4 downward toward the locked lower control piston 6. The locking device 4 of the upper control piston 3 then comes to engage in detent 5' and locks the control piston 3. During this downward movement, the lifting piston 2 which rests on the upper control piston 3 has descended, together with its absorber part, by the same distance. Fingers 11 and 12 have moved into slits 13 and 14 of locking device 7 on the lower control piston 6 during the downward movement of the control piston 3 and have retracted latches 8 and 9 to unlock control piston 6.

If now the operating pressure below the lower control piston 6 is reduced, this piston moves downward to the next lower detent 5'''. As soon as it has engaged therein, fingers 19 and 20 of attachment 18 engage slits 13' and 14' to retract locking device 4 from detent 5' so that now the upper control piston 3, as already described, is again urged downwardly until it reaches a position where locking device 4 engages in detent 5''.

Simple control of the pressure difference between the lower surfaces of control pistons 3 and 6 causes the upward movement of the control rods but in the inverse sequence to that of the downward movement.

If the upward movement of the control rods is effected by a reduction of the pressure acting on the upper control piston 3, i.e., if the pressure in the guide tube 1 above the upper control piston becomes less than the ambient pressure in pressure vessels with an internal control rod arrangement, the control pistons need not be locked alternatively when the control rods are being inserted. This results from the fact that during a malfunction of the control mechanism, the control rods are automatically inserted into the core.

A second embodiment of the control rod drive according to the present invention is shown in FIGS. 2 and 3. A guide tube 1', similar to the guide tube disclosed in FIG. 1, is provided in which the control pistons 3' and 6' are disposed for slidable movement. The upper control piston 3' is provided with a locking device 4' while the lower control piston 6' has a locking device 7'.

Each locking device consists of two latches 8' and 9' which slide on one another and which are pressed into detents 5, 5', 5'', 5'''etc. by springs 10'.

Both control pistons 3' and 6' are traversed axially by a coaxial control rod 21 on which two sets of eccentrics 22 and 22' are fastened for retracting the latches out of the dentents. As seen best in FIG. 3 the eccentrics 22 and 22' engage in openings 23 of latches 8' and 9'. The principle of operation corresponds to that of the embodiment of FIG. 1, except that the eccentrics perform a function similar to that of the fingers, e.g., 11 and 12, and the openings 23 correspond to the slits, e.g., 13 and 14. The eccentrics 22 and 22' are shown here in such a position that latches 8' and 9' are retracted. The eccentrics 22 and 22' for the upper control piston 3' and the lower control piston 6' are offset by 180° with respect to each other so that one control piston is always locked and one is unlocked.

To actuate the two locking devices 4' and 7' an actuating piston 24 is disposed in the interior of the lower control piston 6' is permanently connected with the control rod 21. Above this actuating piston there is provided a control piston 25 which slides on control rod 21 and which carries rollers 26 that move in a steep thread 27 on the exterior wall of the control piston 6'. This control piston 25 has a follower part 25' which moves in an axial groove in rod 21 and through which the rotary movement of control piston 25 is transferred to control rod 21.

To control the pressure at the horizontal faces of the different pistons of the control rod drive, control rod 21 is connected at its lower end in the lower control piston 6' with a control slide valve 28. The connection is such that the control rod 21, together with an attached collar or drag pin 29, can slide in the interior of control slide valve 28 for a distance less than the maximum possible lifting height of the actuating piston 24, after which it carries along the control slide valve 28 through contact with abutments 30 and 31.

Figure 4:
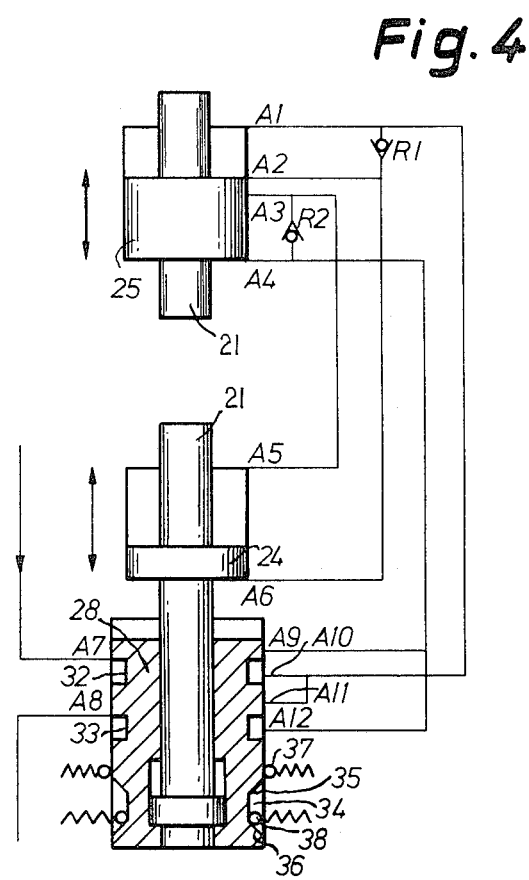
FIG. 4 is a schematic diagram of a control arrangement for the control rod drive of FIG. 2.

The individual connections for the pressure medium to the control slide valve 28 are not shown in FIG. 2, but their arrangement can be seen in the schematic representation in FIG. 4, which will now be described. The control slide valve 28 has two circumferential grooves 32 and 33 extending around its outer cylindrical surface. In the housing of the lower control piston 6' lines for the pressure medium are provided (not shown in FIG. 2) to have ends A7 and A8 directed toward the control slide valve 28. If the control slide valve is in its lower position, as seen in FIG. 4, these ends A7 and A8 are disposed adjacent the upper boundaries of the circular grooves 32 and 33, respectively. Oppositely disposed ends A10 and A12 of lines associated with the lines provided with ends A7 and A8 are disposed just above the lower boundaries of grooves 32' and 33', respectively.

The control slide valve 28 is also associated with lines having ends A9 and A11 which are positioned a bit higher than ends A7 and A8, respectively. A common line leads from ends A9 and A10 into the area below control piston 25, while from ends A10 and A11 a common line leads into the area above control piston 25.

With this arrangement of the lines for the pressure medium, it can be seen that one end for each line carrying the pressure medium to the actuating piston is blocked shortly before one end position of the travel path of control slide valve 28. In order to assure that the actuating piston 24 is always moved to its end position, the control slide valve 28 is provided at its lower end with a circular groove 34 having oblique portions 35 and 36. Spring-tensioned balls 37 and 38 are disposed in the housing of the lower control piston 6' in such a manner that they press against control slide valve 28. Shortly before valve 28 reaches its lower position, the lower balls 38 reach the oblique portion 36 of the circular groove so that the spring pressure of the balls and the distribution of forces at the oblique section 36 push the control slide valve 28 downwardly. Conversely, the upper balls 37 ensure that the control slide valve 28 is moved completely into its upper end position when it reaches a point slightly below this upper end position.

In the following description of operation the example of a downward movement of the control rod 21 will be described in conjunction with the circuit diagram of FIG. 4. With valve 28 in the position illustrated, the pressure medium for actuating the control rod drive reaches the control slide valve 28 via line end A7 and leaves it via line end A10, then reaches the area above the control piston 25 and presses it downwardly. At the same time, the area below piston 25 communicates with thhe pressure medium return line by the path along groove 33 between line ends A12 and A8. This rotates rod 21, due to the relative movement of rollers 26 in threads 27, to bring the upper locking system into engagement while the lower locking system is retracted, this being the condition shown in FIG. 2. At the end of this control movement, a line end A2 above the control piston 25 is unblocked, whereas before pressure medium flowed back from below the control piston 25 via a line end A4 and line ends A12 and A8. A line leads between ends A2 and A6 to the area below the actuating piston 24. This moves the housing of control piston 6' downwardly relative to both rod 21 and casing 1' while pressure medium flows from above the actuating piston 24 via a line end A5 and a check valve R2 into the line between ends A4 and A3 and from there flows out via line ends A12 and A8. By this process the control rod drive is moved from one detent to the next.

When this downward movement is terminated, the control slide valve 28 has changed its position and is now at its upper end position (not shown). Thus the pressure present above the control rod drive now reaches, via ends A7 and A9, end A4 of the control piston 25 and moves it upwardly. The outflowing medium, such as water, from above piston 25 is conducted via ends A1, A11 and A8 to the area below the control rod drive.

At the end of this downward movement the coarse thread 27, rollers 26 and control piston 25 have caused the control rod 21 and the eccentrics 22 and 22' to be turned so that the upper locking system is retracted and the lower locking system is engaged. At the same time control piston 25 has unblocked line end A3. Thus the pressure medium fed in via line end A7 reaches the control rod drive and from there via end A3 to end A5 of the actuating piston 24 and moves it downwardly so tthat the control pistons move together. The outflow is via line end A6, a check valve R1, and line ends A 11 and A8 to the area below the control rod drive. This completes one movement process. If the control rod is to be moved further downward, the above-described process is repeated.

The particular advantage of the embodiments according to the invention is that the step-wise movement of the control pistons occurs automatically without any control from the outside and it is thus automatically assured that one control piston is always locked.

In the embodiment of FIG. 2, when piston 3' is locked by device 4', control rod 21 is prevented from moving downwardly due to its being rigidly fastened to the eccentrics 22 and 22' of locking device 4', which eccentrics are axially immovable relative to piston 3'. If piston 6' is locked by device 7', and even if piston 24 is at its uppermost position, rod 21, which is keyed to the eccentrics 22, 22' of locking device 7' to be axially slidable relative thereto, can move downwardly only through a distance equal to the length of the downward travel path of piston 24 in piston 6', whereupon, piston 3' again becomes locked.

In the second embodiment as seen in FIG. 2 the arrangement of balls 37 and 38 simultaneously solves the problem of bringing a control slide valve automatically into either one of its end positions without any significant expenditures of force.

In both embodiments of the invention the arrangement of two control pistons makes it possible to dimension the connection to the area between the two pistons in such a manner that even with elimination of the operating pressure a control piston which has just been unlocked cannot be strongly accelerated since the liquid between the two control pistons must either be removed or additional liquid must flow in.

It will be understood that the above description of the present invention is susceptible to various modifications, changes and adaptations, and the same are intended to be comprehended within the meaning and range of equivalents of the appended claims.

We claim:

1. In a control rod drive for nuclear reactors which is actuated by a pressure medium and in which the control rod is actuated by a first control piston axially movable within a guide tube, and having locking devices with relatively first movable latch members engageable with detent means on the tube, the improvement comprising, in combination;
   a. a second control piston also axially movable within the guide tube and having locking devices which include relatively second movable latch members which are also engageable with the detent means;
   b. first latch control means cooperating with the first control piston and said second movable latch members for retracting said second latch members when the first piston is in a first position relative to said second piston;
   c. second latch control means cooperating with said second control piston and the first movable latch members for retracting the first latch members when said first piston is in a second position relative to said second piston;

d. whereby, at any given time, one of said first and second movable latch members is in engagement with detent means on the tube.

2. An arrangement as defined in claim 1, wherein said first latch control means includes a first set of dependent fingers on the first control piston which are axially aligned with spaced openings in said second latch members of said locking devices on said second control piston, said second latch members being movable in a direction transverse to the axis of the tube whereby during movement of the first control piston toward said second control piston said fingers enter the spaced openings in said second latch members to retract said latch members from associated detent means.

3. An arrangement as defined in claim 2, wherein said second latch control means includes a member connected to said second control piston, said member extending through the first control piston and terminating beyond the first control piston in an end attachment having a second set of dependent fingers projecting toward openings in the first latch members on the first control piston whereby during movement of said second control piston in a direction away from the first control piston said second set of dependent fingers engages with the first latch members on the first control piston to retract the first latch members from the detent means in which they are engaged axially.

4. An arrangement as defined in claim 1, wherein said first and second latch control means include eccentric means on the control rod and receivable within openings in the latch members of the first control piston and said second control piston, the openings being defined by wall portions on the latch members of the locking devices that are movable relative to each other in a direction transverse to the axis of the guide tube.

5. An arrangement as defined in claim 4, wherein said means further includes an actuating piston axially movable within said second control piston and operatively connected to the control rod, and control means for causing the control rod to rotate as it moves axially relative to said second control piston.

6. An arrangement as defined in claim 5, wherein said control means includes a slidable piston which is axially displaceable along the control rod, roller means carried by said slidable piston and engageable with thread means on said second control piston, said slidable piston having follower means connecting said piston to the control rod, whereby rotary movement of said slidable piston is imparted to the control rod.

7. An arrangement as defined in claim 4, further comprising a control slide valve connected to one end of the control rod to be axially movable within said second control piston.

8. An arrangement as defined in claim 7, wherein said control slide valve has a circular groove at one end thereof, the spaced side wall portions of the groove diverging outward from the bottom of the groove and further comprising a plurality of sets of oppositely disposed balls urged against spaced portions of said control slide valve at the location of the groove by resilient means carried in said second control piston, one set of balls being axially spaced relative to another set whereby said one set of balls coacts against one side wall portion of the groove while the other said set coacts against said control slide valve.

9. An arrangement as defined in claim 7, wherein the control rod is connected to said control slide valve by means of a collar slidable in said control slide valve through an axial distance which is less than the distance said slidable piston can move axially in said second control piston, whereby said collar contacts spaced portions of said control pusher before said slidable piston reaches its end positions within said second control piston and said control slide valve is axially moved within said second control piston.

10. An arrangement as defined in claim 1, wherein each locking device includes latch members which are offset at the center portion of the locking device and are slidable with respect to each other.

* * * * *